United States Patent Office 2,694,388
Patented Nov. 16, 1954

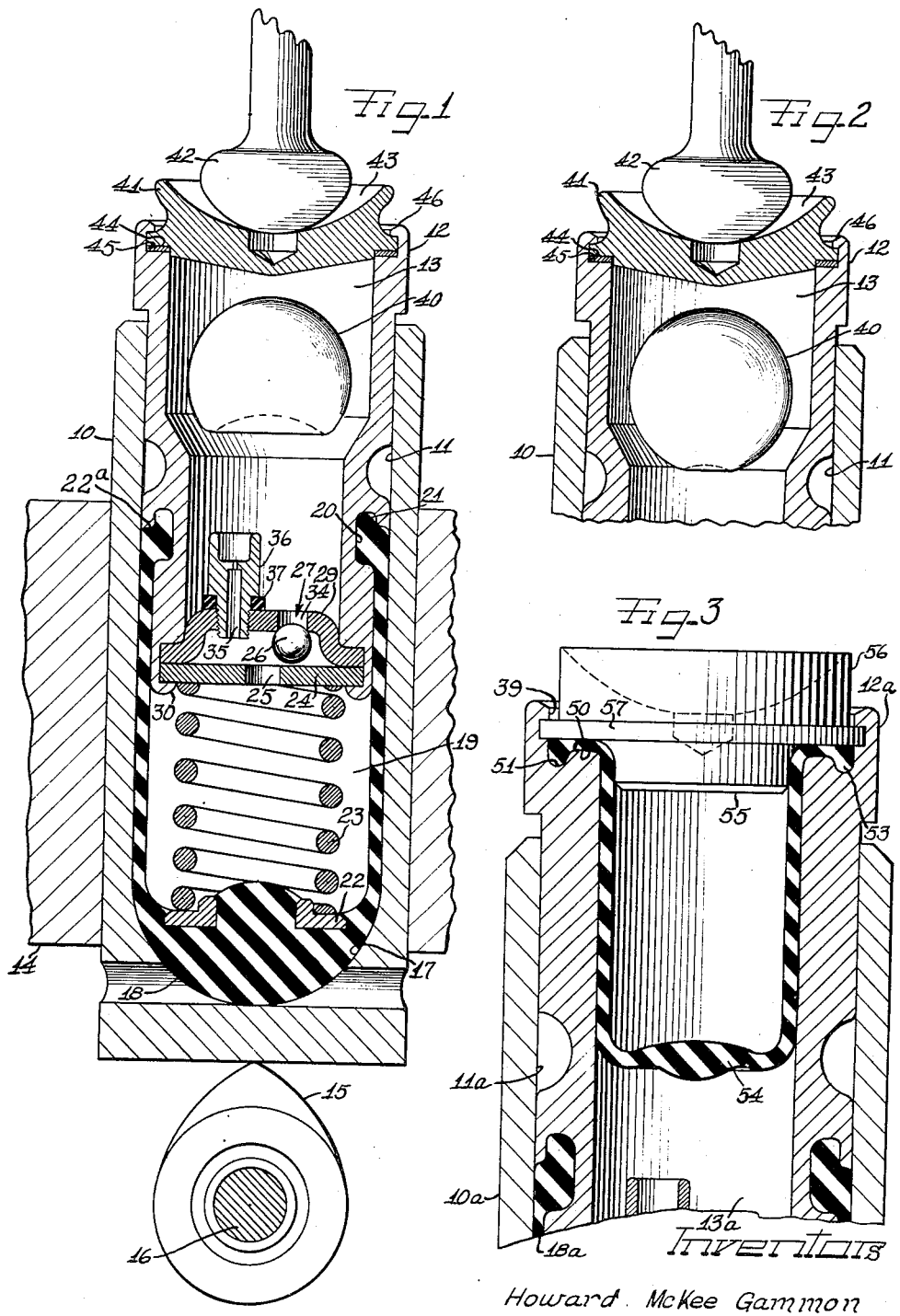

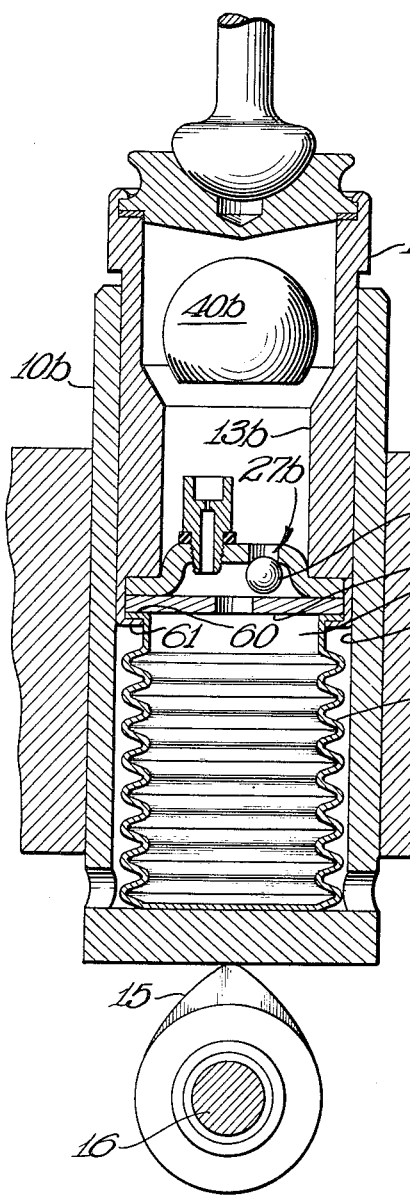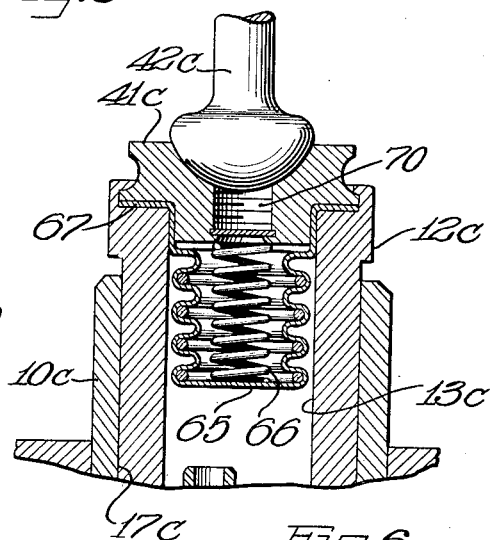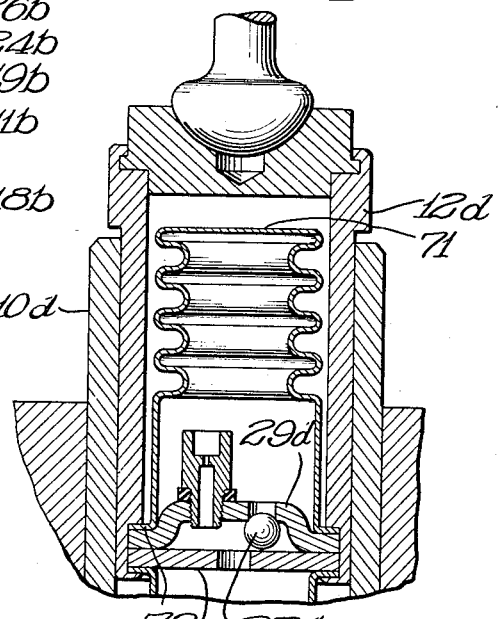

2,694,388

SELF-CONTAINED HYDRAULIC VALVE TRAIN LENGTH ADJUSTING MECHANISM

Howard McKee Gammon, Willoughby, and Forrest W. Sward, Euclid, Ohio, assignors to Thompson Products, Inc., Cleveland, Ohio, a corporation of Ohio Application December 30, 1950, Serial No. 203,682

2 Claims. (Cl. 123—90)

This invention relates to improvements in operating mechanisms for the valves of internal combustion engines, and more particularly relates to a self-contained hydraulic device for correcting the length of the valve train to zero clearance or any stipulated fixed clearance value, to secure a more efficient and quiet operation of the engine valves.

Hydraulic takeups or valve train length adjusters of the type continually supplied with oil from the engine and of the self-contained type of the general character of my invention have heretofore been employed, but such devices have been unduly complicated and expensive to manufacture, requiring close machining tolerances, and difficulties have arisen in their performance in many instances. One difficulty has been to provide such a device capable of functioning properly over the extended range of temperatures encountered, and capable of withstanding the stresses resulting from the high frequency impulses to which they are subjected at the high operating speeds encountered with the modern engine, and still maintain a relatively small, compact and light weight device which will not adversely affect the operation of the valve actuating mechanism, or require alteration of the design of the mechanism of the engine, and still maintain the device in a simple form which may be cheaply manufactured with a minimum of machining to close tolerances, and which requires little if any maintenance.

Furthermore, hydraulic adjusters which employ engine oil as a hydraulic medium, often become inoperative as the result of air entrained in the oil being carried to the high pressure portion of the unit, causing sponginess with a resultant noisy valve operation. Also foreign matter such as dirt, metal particles, and products of oil decomposition carried by the engine oil will frequently clog and bind an engine oil supplied valve train length adjuster, rendering it inoperative.

A principal object of our invention is to provide a novel and improved form of self-contained valve train length adjusting device arranged with a view toward utmost simplicity, efficiency and compactness in construction and operation.

Another object of our invention is to provide a small, compact and efficient self-contained automatic valve train adjusting device of the hydraulic type in which the close machining operations heretofore necessary in such devices are reduced to a minimum.

Still another object of our invention is to provide a hydraulic valve clearance takeup device or valve train length adjuster, in which air or gas is separated from the hydraulic medium, thus eliminating the possibility of air emulsification in the oil.

Still another object of this invention is to provide an automatic valve train length adjuster in which dirt or foreign matter is excluded from the hydraulic medium, thus eliminating the possibility of clogging, binding, or excessive abrasive wear.

A further object of our invention is to provide a valve linkage length adjuster in which a liquid medium is employed within a closed fluid system divided into two interconnected fluid chambers, one of which is a load carrying hydraulic trap, and the other of which is a reservoir or a hydraulic fluid storage chamber, containing or interconnected with a flexible chamber to compensate for liquid volume changes within the reservoir.

A further object of our invention is to provide a valve clearance takeup device or valve train length adjuster, of the character described in which a liquid medium is employed within a closed fluid system and a flexible chamber is associated with the system to compensate for volume changes of fluid within the system.

A still further object of our invention is to provide a valve takeup or valve train takeup device comprising a cylinder having a hollow piston reciprocable therein, with valve means communicating between the cylinder and hollow interior of the piston, and a flexible chamber filled with a gaseous medium associated with the cylinder and piston to effect relative displacement thereof and to compensate for changes of volume of the fluid within the piston.

In carrying out our invention we provide a new and improved form of self-contained hydraulic length adjuster for the valve trains of internal combustion engines, wherein the valve actuator includes a hollow casing, an inner wall of which forms a cylinder having a hollow piston movable therein, in which the hollow interior of the piston defines a storage reservoir sealed at its outer end and containing a hydraulic medium therein, with valve means between the inner end of the piston and the cylinder allowing the hydraulic medium to pass from the reservoir to the portion of the cylinder beneath the piston at a relatively rapid rate by the expanding action of a flexible chamber associated with the reservoir. This chamber forces the piston to move with respect to the cylinder to take up lash or clearance and at the same time to compensate for fluid volume changes within the reservoir. We also provide a bleeder passage between the cylinder and reservoir to allow the hydraulic medium to return to the reservoir at a slow rate upon contraction of the mechanism, the valve means between the piston and cylinder allowing the passage of oil from the reservoir to cylinder at a rapid rate and preventing the return of the hydraulic medium to the reservoir except through the bleeder passageway, such that takeup clearance is provided to compensate for linkage lengthening changes during each cycle of the valve linkage mechanism.

These and other objects of our invention will appear from time to time as the following specification proceeds and with reference to the accompanying drawings wherein:

Figure 1 is a vertical sectional view taken through an automatic valve linkage length-adjusting mechanism constructed in accordance with our invention, showing the mechanism in operating position, with the valve open;

Figure 2 is a fragmentary vertical sectional view taken through the valve linkage length-adjusting mechanism showing the position of the flexible chamber when the valve is closed;

Figure 3 is a fragmentary vertical sectional view taken through an automatic valve linkage length adjusting mechanism, illustrating another form in which our invention may be embodied;

Figure 4 is a vertical sectional view taken through an automatic valve linkage length adjusting mechanism constructed in accordance with our invention and illustrating another form in which our invention may be embodied;

Figure 5 is a fragmentary vertical sectional view illustrating another modified form in which our invention may be embodied; and Figure 6 is a fragmentary vertical sectional view illustrating still another form in which our invention may be embodied.

In the form of our invention illustrated in Figures 1 and 2 of the drawings, the mechanism includes an outer shell or casing 10 of a generally cylindrical form open at its upper end and having a cylindrical inner wall to slidably receive a hollow piston 12, the interior of which forms a storage reservoir for hydraulic fluid, such as oil. The casing 10 may be slidably mounted in a cylindrical tappet guide 14 of the type commonly associated with the engine blocks of internal combustion engines, and may be reciprocated by means of a cam 15 on the usual cam shaft 16. The cam 15 is herein shown as engaging the bottom of said casing in order to alternately open and close an associated engine valve upon rotatable movement of said cam.

The inner cylindrical wall 11 is machined to slidably receive the piston 12. The cylindrical wall 11 terminates at its lower end into a semi-spherical bottom wall 17, engaged by the semi-spherical bottom of an oil sack 18 mounted within said cylinder and extending upwardly along the wall thereof for a portion of its length and encircling or otherwise sealed to the lower portion of piston 12. The space within the oil sack 18 between the end of the piston and the lower end of said sack forms a load carrying trap or under piston chamber 19, which is normally filled with oil. The oil sack 18 may be of various suitable forms and may be made from a flexible oil resistant material, such as an oil resistant rubber, an elastomer, or any other suitable flexible material.

The lower outer wall portion of the piston 12 is of a reduced diameter and terminates into an annular shouldered groove or recess 20 to receive an inwardly spaced upwardly extending flanged portion or lip 21 of the oil sack 18, to provide an oil tight connection between said sack and piston. The outer wall of said piston forms a lip 22a extending downwardly over the upper margin of said groove. Engagement of said lip with said flanged portion 21 causes pressure to be exerted against the flanged portion 21 holding said flanged portion into engagement with said groove, and effectively sealing said sack to the outer wall of said piston. The lower end of the casing 10 is drilled through the semi-spherical bottom portion thereof to allow the escape of air when inserting the sack 18 within said cylinder and to assure that said sack be in tight engagement with the end of said cylinder.

The sack 18 serves both as an expansible oil chamber and a seal for the piston, thus obviating the necessity of machining the cylinder and piston to the close tolerances heretofore necessary.

A seat 22 for a spring 23, is herein shown as being molded in the bottom interior portion of the oil sack 18. The spring 23 is seated at its lower end in the seat 22 and at its upper end on a retaining plate 24 having an apertured central portion 25 forming an orifice for the passage of fluid therethrough. The plate 24 also forms a stop plate for a ball 26 of a check valve 27. The retaining plate 24 abuts an annular flanged lower portion of a cage 29 of the check valve 27 and is herein shown as being secured within the hollow interior of the piston 12 in abutting relation with said flanged portion of said cage, by a rolled over lower end portion of said piston engaging the plate 24, as indicated generally by reference character 30.

The cage 29 for the check valve 27 is of an inverted dish-shaped formation and has an apertured orifice 34 leading therethrough closed by the ball 26 upon the upstroke of the casing 10, and opened at the end of the downstroke thereof, to allow fluid in a storage reservoir 13 to be displaced to the under piston chamber 19 within the oil sack 18 at a relatively rapid rate, and to extend the piston 12 from the cylinder 11 a distance equal to the valve clearance, to take up the clearance thereof.

The diameter of the ball 26 is greater than the space between the plate 24 and the inside of the cage 29 and said ball fits within the orifice 34 at all times during operation of the valve, and may drop and rest upon the plate 25 when the check valve is open. When the check valve is open the ball is retained in place by loose engagement with the side wall of said orifice.

A bleeder passageway 35 is provided between the storage reservoir 13 and the under piston chamber 19 to permit oil to bleed from the under piston chamber to the storage reservoir at a relatively slow rate during the period the valve is open and the ball 26 of the check valve 27 is seated within the orifice 34. This bleeding action creates a slight shortening of the valve actuating linkage each cycle so that clearance may be created to accommodate any lengthening tendency of any of the parts of the valve train. As herein shown, the passageway 35 is formed in a jet member 36 threaded within the cage 29 and has engagement with a sealing ring 37 encircling the threaded portion of said jet member and abutting a shouldered portion thereof.

The storage reservoir 13 is shown in Fig. 1 as having a flexible chamber 40 in the form of a sphere floatingly mounted therein. While the chamber 40 is here shown as being in the form of a sphere, it need not be in this form and may be of any other desired form. The sphere 40 may be made from an oil resistant rubber or an elastomer, or any other flexible oil resistant material, and is provided to compensate for volume changes of fluid within the reservoir and to facilitate a rapid refill of the under piston chamber 19 formed in the oil sack 18, as will hereinafter more clearly appear as this specification proceeds.

A seat 41 for a push rod 42 is herein shown as closing the upper end of the hollow inside of the piston 12 and as retaining the hydraulic medium therein. The seat 41 may have a generally spherical recessed portion 43, receiving the rounded lower end portion of the push rod 42 or may be flat to accommodate engines without push rods. The seat 41 may abut a washer 44 mounted in a shouldered upper portion 45 of the hollow interior of the piston 12. Said washer may preferably be made from a soft metallic material, such as copper. The seat 41 may be sealed to the open end of the piston 12 in fluid tight relation with respect thereto by rolling over the end of said piston into engagement with said seat as indicated generally by reference character 46.

It should here be understood that before sealing the end of the piston 12 by the seat 41 that the chamber 19 and reservoir 13 may first be filled with the required hydraulic medium, with the chamber 40 in place therein. Thus when said reservoir and under piston chamber are filled with the hydraulic medium and sealed under pressure, a self-contained fluid system is provided within the piston 12 and oil sack 18. The flexible chamber contained within the reservoir 13 will thus compensate for fluid displaced from the oil sack 18 and at the same time will force the piston 12 to extend from the casing 10, elongating the oil sack to take up clearance if such exists when the valve is closed.

It may be seen from the foregoing that if the under piston chamber 19 and storage reservoir 13 are supplied with hydraulic fluid, such as oil, that the check valve 27 will permit fluid to flow through the passage 34 and into the under piston chamber 19 on outward movement of the piston with respect to the cylinder 11 at a relatively rapid rate, but will prevent rapid movement of the piston into said cylinder, the flow of liquid back into said reservoir taking place gradualy, through the passageway 35 in the jet member 36.

The spring 23 yieldably urges the piston outward with respect to the cylinder and thus tends to engage the seat 41 with the lower end of the valve tappet or push rod 42, taking up any clearance which may exist in the valve actuating mechanism.

As the cam shaft 16 is rotated, and the mechanism is moved upwardly as an entirety, the piston 12 and the casing 10 act as a rigid unit, the cam thrust being transmitted through the hydraulic medium to the push rod 42, to unseat the engine valve. Increases in length of the other parts of the valve actuating mechanism, as a result of temperature rises are accommodated by the discharge of liquid from cycle to cycle into the storage chamber 13 from the under piston chamber 19. On the other hand, any play in the valve actuating mechanism resulting from decrease in temperature of the parts thereof results in immediate outward compensating movement of the piston, the liquid flowing into the under piston chamber 19 through the valve passage 34, causing pressure to be exerted on the bottom of the piston as a result of pressure created by the flexible chamber 40, in the storage reservoir 13. Thus the effective length of the device is automatically and rapidly increased whenever such increase is required but is contracted in length only at a fairly slow rate, and during operation, the device acts as a substantially rigid member under compression. The force exerted on the bottom of the piston as a result of pressure in the flexible chamber is of course less than that exerted by the engine valve spring (not shown), so that there is no tendency to unseat the valve other than by operation of the usual valve cam shaft.

In order to cause the transposition of the hydraulic medium between the reservoir 13 and the under piston chamber 19, the chamber 40 has been provided within the storage reservoir 13 and is shown in Figure 1 as being floating within said reservoir although it need not float. The chamber 40 may be filled with air or any other gaseous medium or may be expansible and retractible as a result of spring loading to create pressure within the system, to an extent sufficient to cause a relatively rapid transportation of the hydraulic medium into the under piston chamber 19, through the check valve 27, with the resultant increase in length of the valve linkage length compensating mechanism by movement of the piston 12, outwardly of the cylinder 11. By such movement the oil sack 18 may stretch an amount equal to the outward travel of the piston 12 with respect to the cylinder 11 it being understood that this movement is very slight, being equal to that necessary to take up any clearance in the valve linkage whenever the valve is closed.

While the chamber 40 is herein referred to as being pressurized or filled with a gaseous medium under pressure, it should be understood that it may be a sealed chamber as well, which may be compressed upon increases in volume of fluid in the reservoir 13 and may expand of its own resiliency to compensate for decreases in the fluid volume in the reservoir 13 or increases in the volumetric capacity of said reservoir, so as to provide a flexible chamber compensating for changes in volume of oil within the reservoir 13.

It may further be seen that the pressurized chamber 40 within the reservoir 13, by positively compensating for changes of volume of oil within said reservoir, may take the place of the return spring 23 rendering said spring unnecessary for ordinary operating conditions of the takeup mechanism. Also, since the air under pressure is contained within the chamber 40, there is no mixture of the pressurized air with the oil, with the resultant elimination of the possibility of air emulsification in the oil.

In the modified form of our invention shown in Fig. 3, a piston 12a is shown as being reciprocably movable within a cylinder 11a of a casing 10a of the valve train length adjusting mechanism. The casing 10a and cylinder 11a are of the same general construction as shown in the form of our invention in Figs. 1 and 2 and the under piston chamber is formed by an oil sack 18a secured to a piston 12a in the same manner the oil sack 18 is secured to the piston 12. A bleeder passage and check valve (not shown) similar to the bleeder passage 35 and check valve 27 are also provided between the under piston chamber formed by the inside of the oil sack 18a and a storage reservoir 13a formed within the piston 12a.

The piston 12a is herein shown as having an upward opening shouldered portion 50 adjacent its upper end, extending outwardly from the bore of said piston and having an annular recess 51 extending around the outer periphery of said shouldered portion and receiving a depending rib 53 of a flexible sack or boot 54, extending within the inner periphery of the piston 12a along the wall thereof, for a portion of the length thereof, and closing off said storage reservoir for a portion of its length. The open end of the boot 54 may be closed by a depending lug 55 of a tappet or push rod seat 56. The upper portion of said boot may be abutted by a flange 57, extending outwardly from said seat, and herein shown as being held in engagement with the outwardly flaring flanged portion of the boot 54 by a rolled over outer end portion 39 of the piston 12a.

In assembling the member illustrated in Fig. 3 the under piston chamber and the storage reservoir 13a may first be filled with oil to a predetermined level. The boot or flexible sack 54 may then be inserted within the upper end portion of the storage reservoir 13a and filled with a gaseous medium such as air under pressure and closed by the push rod seat 56, engaged with the outwardly flared outer end portion of said boot 54 and held in air tight engagement therewith by rolling the outer edge of the piston 12a over the flanged portion 57 thereof. If desired, the push rod seat 56 may be provided with a suitable valve means (not shown) to facilitate the pressurizing of the pressure chamber formed within the boot 54 after said push rod seat has been sealed thereto. The boot or flexible sack 54 may be any self-expansible unit such as a diaphragm or bellows and made from any suitable material.

The mechanism illustrated in Fig. 3 operates in the same manner as that illustrated in Figs. 1 and 2 and upon contraction of the piston 12a within the cylinder 11a as a result of the transposition of the hydraulic medium from the under piston chamber 19 through the bleeder passage to the reservoir 13a, the boot 54 being filled with a compressible medium such as air will accommodate the increase in fluid volume in the reservoir 13a and the boot 54 will expand and cause a relatively rapid flow of the hydraulic medium to the under piston chamber formed within the oil sack 18a, to take up any clearance present in the valve operating mechanism when the valve is closed.

In the modified form of our invention shown in Figure 4, a piston 12b, like the piston 12 is shown as being reciprocably movable within a cylinder 11b of a casing 10b of the valve train length adjusting mechanism. The casing 10b and cylinder 11b are of the same general construction as that shown in the form of our invention of Figures 1 and 2.

A bellows 18b is secured to the bottom of the piston 12b within the cylinder 11b and the interior thereof forms an under piston chamber 19b. The bellows 18b may be of any well known form of expansible bellows made from metal, rubber or an elastomer, and is herein shown as being seated against the bottom of the cylinder 11a at its closed end and having a flanged upper end 60 abutting the bottom of a bottom plate 24b. Said flange may be held in fluid tight abutting relation with respect to said plate by a rolled over lower end portion of said piston rolled into engagement with the flange 60, as indicated generally by the reference character 61.

The plate 24b like the plate 24 shown in Figure 1, has a central orifice extending therethrough and forms a stop plate for ball 26b of a check valve 27b. The check valve 27b is like the check valve 27 and acts in the same manner as said check valve so need not herein be described further.

The hollow interior of the piston 12b is shown as having a flexible chamber 40b in the form of sphere floatingly mounted therein, to compensate for volume changes of fluid within the reservoir and to facilitate a rapid refill of the under piston chamber 19b, as previously described when referring to the form of our invention illustrated in Figure 1.

The valve linkage length adjusting mechanism illustrated in Figure 4 operates in the same manner as that illustrated in Figure 1 and upon contraction of the piston 12b within the cylinder 11b to compensate for an increase in length of the valve train, the chamber 40b will be contracted by the pressure of the oil within the reservoir 13b and upon expansion of the chamber 40b, a relatively rapid flow of the hydraulic medium will pass to the under piston chamber 19b formed within the bellows 18b and extend the piston from the cylinder 11b.

In this form of our invention the spring in the under piston chamber is dispensed with and the chamber 40b within the reservoir 13b, by positively compensating for changes of volume of oil within said reservoir, takes the place of a return spring. Thus, upon increases in length of the mechanism, the chamber 40b when expanding will force oil into the under piston chamber 19b through the valve 27b causing movement of the piston 12b outwardly of the cylinder 10b, to compensate for increases in valve tappet clearance or increases in clearance between the parts of the valve linkage mechanism.

In the form of our invention illustrated in Fig. 5, a spring loaded pressure chamber 65 is shown as being carried within a storage reservoir 13c contained within the piston 12c. This chamber may be loaded to the extent necessary to create sufficient pressure within the system to cause a relatively rapid transposition of the hydraulic medium into the under piston chamber, with the resultant increase in length of the mechanism by movement of a piston 12c outwardly of a casing 10c. In this form of our invention, the under piston chamber may be like those shown in Figures 1 or 4 and a check valve and bleeder (not shown) similar to those shown in these figures may be provided between the reservoir 13c and the under piston chamber.

The spring loaded chamber 65 is herein shown as comprising a flexible bellows which may be a well known form made from metal, rubber or an elastomer having a spring 66 therein to expand the bellows and loaded to create the desired pressure within the system. The bellows 65 is herein shown as having a flanged upper portion 67 extending along the interior wall of the piston and outwardly along a shouldered wall portion thereof and abutting a seat 41c of the valve tappet or stem 42c. Said seat and bellows may be secured and sealed to said piston by rolling the top thereof over the lower edge portion of the seat 41c.

The spring 66 is herein shown as being interposed between the bottom of the bellows 65 and the seat 41c. A filler plug 70 is shown as being provided to permit the bellows 65 to be filled with any desired fluid to augment or replace the spring.

In the form of our invention illustrated in Figure 6 an expansible bellows 71 is shown as being mounted within the interior of the piston 12d in communication with a check valve 27d. The interior of said bellows forms an expansible storage reservoir for the hydraulic medium. Said bellows has a flanged lower portion 72 interposed between the flange of a cage 29d of a check valve 27d and a shouldered inner portion of the wall of a piston 12d. Said bellows is shown as being sealed to said wall portion as by rolling over the lower edge against a plate 24d for the valve.

The expansible bellows 71 may be of any suitable construction and may be formed from metal, rubber, or an elastomer. In this form of our invention the sealed hollow interior of the piston 12d acts as the pressure chamber, exerting pressure against or relieving pressure from the bellows 71 upon extension or retraction of said piston with respect to the casing 10d and creating sufficient pressure against the bellows 71 to cause a relatively rapid transportation of the hydraulic medium into the under piston chamber to extend the mechanism, and relieving pressure thereupon and allowing the oil to bleed back into the hollow interior of said bellows during retraction of the mechanism, as has been hereinbefore described in the description of the form of our invention illustrated in Figs. 1 and 2.

It will be understood that modifications and variations may be effected without departing from the scope of the novel concepts of the present invention.

We claim as our invention:

1. In a hydraulic automatically expansible valve train length adjusting device, a casing the inner wall of which defines a cylinder, a hollow piston reciprocable within said cylinder, the hollow interior of which defines a storage reservoir, a flexible sack extending along the wall of said cylinder and abutting the inner end thereof, said sack also encircling said piston for a portion of the length thereof and having sealing engagement therewith and defining an under piston chamber, and the end of said chamber opposite said piston being open to atmosphere to accommodate said sack to be extended to the end thereof, spring means interposed between the end of said sack and said piston and urging said piston in outwardly extended relation with respect to said cylinder, check valve means between the inner end of said piston and said cylinder and allowing the passage of oil from said reservoir to said under piston chamber, a bleeder passageway between said reservoir and said under piston chamber and allowing the passage of oil from said under piston chamber to said reservoir at a relatively slow rate, to cause contraction of said device, and a floating pressurized flexible chamber within said reservoir to compensate for volume changes of fluid in said reservoir.

2. In an automatically extensible hydraulic valve train length adjusting device, the combination with a cylinder of a hollow piston moving in said cylinder, the hollow interior of which forms a storage reservoir for a hydraulic medium, the end of said cylinder opposite said storage reservoir being open to atmosphere, an expansible chamber within said cylinder having sealing engagement with the inner end of said piston and forming an under piston chamber closing the open end of said cylinder, check valve means at the inner end of said piston controlling the passage of fluid between said storage reservoir and under piston chamber, means sealing the outer end of said piston, and a flexible sealed pressurized chamber contained within said storage reservoir to compensate for volume changes of fluid within said reservoir and exerting pressure on said under piston chamber in a direction to urge said piston to extend from said cylinder, said last mentioned chamber serving as a return spring for said piston and preventing the contamination of the oil within said reservoir with air.

References Cited in the file of this patent

UNITED STATES PATENTS

| Number | Name | Date |
|---|---|---|
| 2,109,459 | Best | Mar. 1, 1938 |
| 2,109,816 | Best | Mar. 1, 1938 |
| 2,203,952 | Eshbaugh | June 11, 1940 |
| 2,278,963 | Arola | Apr. 7, 1942 |
| 2,404,241 | MacMillan | July 16, 1946 |
| 2,438,631 | Bergmann | Mar. 30, 1948 |
| 2,460,651 | Pacquin | Feb. 1, 1949 |
| 2,542,036 | Knaggs | Feb. 20, 1951 |
| 2,553,756 | Engemann | May 22, 1951 |
| 2,577,852 | Hufferd | Dec. 11, 1951 |
| 2,612,419 | Reynolds | Sept. 30, 1952 |